United States Patent
Khavari et al.

(10) Patent No.: US 11,780,989 B2
(45) Date of Patent: Oct. 10, 2023

(54) OPTICALLY ACTIVE BUILD MATERIALS FOR 3D PRINTING

(71) Applicant: 3D Systems, Inc., Rock Hill, SC (US)

(72) Inventors: Mehrgan Khavari, Rock Hill, SC (US); Khalil Moussa, Chapel Hill, NC (US); Scott Broce, Rock Hill, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/826,878

(22) Filed: May 27, 2022

(65) Prior Publication Data

US 2022/0363867 A1 Nov. 17, 2022

Related U.S. Application Data

(62) Division of application No. 17/060,826, filed on Oct. 1, 2020, now Pat. No. 11,377,538.

(60) Provisional application No. 62/909,044, filed on Oct. 1, 2019.

(51) Int. Cl.
| | |
|---|---|
| *C08F 2/46* | (2006.01) |
| *C08F 2/50* | (2006.01) |
| *C08G 61/04* | (2006.01) |
| *C08K 5/08* | (2006.01) |
| *C08F 220/50* | (2006.01) |
| *C08F 226/06* | (2006.01) |

(52) U.S. Cl.
CPC .............. *C08K 5/08* (2013.01); *C08F 220/50* (2013.01); *C08F 226/06* (2013.01)

(58) Field of Classification Search
CPC ...... C08K 5/08; C09D 11/037; C09D 11/328; C09D 11/101; B33Y 70/00; B33Y 80/00; C08F 226/06; C08F 220/50
USPC ........... 522/79, 74, 71, 1, 189, 184, 6; 520/1
See application file for complete search history.

(56) References Cited

U.S. PATENT DOCUMENTS

| | | |
|---|---|---|
| 2008/0260960 A1 | 10/2008 | Crivello et al. |
| 2009/0023085 A1 | 1/2009 | Tsuchimura |
| 2013/0109779 A1 | 5/2013 | Argal et al. |
| 2014/0315129 A1 | 10/2014 | Kidnie |
| 2017/0014544 A1 | 1/2017 | Coqueret et al. |
| 2017/0210922 A1 | 7/2017 | Breton et al. |

FOREIGN PATENT DOCUMENTS

| | | | |
|---|---|---|---|
| CN | 109897225 | 6/2019 | |
| EP | 1826200 | 8/2007 | |
| GB | 2307473 | 5/1997 | |
| JP | 2010-156724 A | 7/2010 | |
| JP | 2012-093586 A | 5/2012 | |
| JP | 2017-537178 A | 12/2017 | |
| JP | 2018-100340 A | 6/2018 | |
| WO | 2008078469 | 7/2008 | |
| WO | 2008078469 A1 | 7/2008 | |
| WO | WO-2008078469 A1 * | 7/2008 | ............. C09J 11/06 |
| WO | 2017068590 | 4/2017 | |
| WO | 2018219729 | 12/2018 | |
| WO | 2018234898 | 12/2018 | |

OTHER PUBLICATIONS

Oshima et al, WO 2008078469 Machine Translation, 2008 (Year: 2008).*
PCT International Search Report for International Search Authority for PCT/US2020/053737 dated Dec. 18, 2020 (7 pages).
PCT International Written Opinion for International Search Authority for PCT/US2020/053737 dated Dec. 18, 2020 (6 pages).
English translation of Japanese First Office Action for Japanese Application No. 2022-520008 dated Apr. 6, 2023 (5 pages).

* cited by examiner

*Primary Examiner* — Jessica Whiteley
(74) *Attorney, Agent, or Firm* — Maynard Nexsen PC; John P. Zimmer (57) ABSTRACT

Build materials for 3D printing applications are described herein which, in some embodiments, comprise a dye component operable to alter spectral characteristics of the printed part over the course of the build cycle. In some embodiments, for example, the dye component can provide desirable light penetration depth during article printing and sufficient optical clarity during final light curing processes.

24 Claims, 2 Drawing Sheets

OPTICALLY ACTIVE BUILD MATERIALS FOR 3D PRINTING

RELATED APPLICATION DATA

The present application is a divisional of U.S. patent application Ser. No. 17/060,826 filed Oct. 1, 2020, which claims priority benefit pursuant to 35 U.S.C. § 119(e) to U.S. Provisional Patent Application No. 62/909,044 filed Oct. 1, 2019, the contents of each of which are incorporated herein by reference in their entirety.

FIELD

The present invention relates to three-dimensional build materials and, in particular, to polymerizable liquids for printing three-dimensional articles exhibiting spectral changes during photocuring.

BACKGROUND 3D printers employ build materials, which are also known as inks, to form various 3D objects, articles, or parts in accordance with computer generated files. In some instances, the build material is solid at ambient temperatures and converts to liquid at elevated jetting temperatures. In other instances, the build material is liquid at ambient temperatures.

Build materials can comprise a variety of chemical species. Chemical species included in a build material can be selected according to various considerations including, but not limited to, desired chemical and/or mechanical properties of the printed article, design features of the printed article and operating parameters of the 3D printing apparatus.

Dyes and pigments are often included in photo reactive projector and laser based 3D printable formulations where they serve a dual purpose. Dyes and pigments provide the color and opacity of the final 3D printed object and they function to limit the light penetration depth during the printing process. This control of light penetration depth controls the thickness of polymerization during the formation of each 3D printed layer. The ability to resolve small negative features like holes & slots as well as crisp flat surfaces and positive features depends on tight control of the light penetration depth. As additional layers are imaged, stray light can enter the part and carry to the negative features and outer surfaces where it can further polymerize material resulting in problems resolving small negative features and problems with overall dimensional accuracy. Tight control of light penetration depth greatly improves the printed surface quality and accuracy for surfaces perpendicular to the direction of light.

Printed parts exit the printer coated with uncured resin. Parts are cleaned of residual uncured resin and allowed to dry. Parts at this stage are considered "green" cured. The photo reactive material has been exposed to enough light to convert from liquid to a soft solid, but additional photoreaction is required to complete the polymerization process and obtain the full mechanical strength and other material properties. This additional photoreaction is completed by placing the "green" cured part in an additional curing light chamber and providing sufficient time, temperature, and light intensity with the correct light spectrum to complete the polymerization process.

Notably, most dyes or pigments used in the formulation to control light penetration depth during printing inhibit light from penetrating deeply into the part during the additional curing process. If the post-printing curing light cannot penetrate deeply into the part, the core of the part will remain mostly green even if the surface is fully cured. This can create several different failure modes of the resultant article.

SUMMARY

In view of these disadvantages, build materials for 3D printing applications are described herein which, in some embodiments, comprise a dye component operable to alter spectral characteristics of the printed part over the course of the build cycle. In some embodiments, for example, the dye component can provide desirable light penetration depth during article printing and sufficient optical clarity during final light curing processes. A polymerizable liquid, in some embodiments, comprises a monomeric photocurable material, an oligomeric photocurable material, or mixtures thereof; a photoinitiator component; and a dye component, wherein the dye component fades during photocuring of the polymerizable liquid to provide an article satisfying the relation $$\frac{T_a}{T_c} \geq 0.75$$

where $T_a$ and $T_c$ are maximum transmittance values from 400-500 nm for the article and a dyeless control article, respectively. In some embodiments, $$\frac{T_a}{T_c} \geq 0.8.$$

In another aspect, a polymerizable liquid comprises a monomeric photocurable material, an oligomeric photocurable material, or mixtures thereof; a photoinitiator component; and a dye component comprising a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

In another aspect, methods of printing three-dimensional articles are described herein. A method comprises providing a polymerizable liquid comprising a monomeric photocurable material, an oligomeric photocurable material, or mixtures thereof; a photoinitiator component; and a dye component. The polymerizable liquid is photocured to form the article, the article satisfying the relation $$\frac{T_a}{T_c} \geq 0.75$$

where $T_a$ and $T_c$ are maximum transmittance values under 400-500 nm for the article and a dyeless control article, respectively.

In another aspect, a method of printing a three-dimensional article comprises providing a polymerizable liquid comprising a monomeric photocurable material, an oligomeric photocurable material, or mixtures thereof; a photoinitiator component; and a dye component. The polymerizable liquid is photocured to form the article, wherein the dye component comprises a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

In some embodiments of methods described herein, the article is formed via a layer-by-layer process, wherein layer formation is administered via deposition and irradiation of a layer of the polymerizable liquid.

These and other embodiments are further described in the following detailed description.

BRIEF DESCRIPTION OF THE DRAWINGS

FIG. 1 illustrates a cross-sectional vial of an apparatus for determining the ratio $$\frac{T_a}{T_c}$$

according to embodiments described herein.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

In one aspect, polymerizable liquids for use in 3D printing applications are described herein. The polymerizable liquids, for example, can be employed in a variety of different 3D printers, such as those based on Stereolithography (SLA), Digital Light Processing (DLP), and Multi-jet Printing (MjP). A polymerizable liquid, in some embodiments, comprises a monomeric photocurable material, an oligomeric photocurable material, or mixtures thereof; a photoinitiator component; and a dye component, wherein the dye component fades during photocuring of the polymerizable liquid to provide an article satisfying the relation $$\frac{T_a}{T_c} \geq 0.75$$

where $T_a$ and $T_c$ are maximum transmittance values from 400-500 nm for the article and a dyeless control article, respectively. In some embodiments, $$\frac{T_a}{T_c} \geq 0.8 \text{ or } \frac{T_a}{T_c} \geq 0.9.$$

In another aspect, a polymerizable liquid comprises a monomeric photocurable material, an oligomeric photocurable material, or mixtures thereof; a photoinitiator component; and a dye component comprising a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

As described herein, the polymerizable liquid comprises a monomeric photocurable material, an oligomeric photocurable material, or mixtures thereof. In some embodiments, the monomeric and/or oligomeric curable material described herein is photo-polymerizable or photocurable at wavelengths ranging from about 300 nm to about 400 nm or from about 320 nm to about 380 nm. Alternatively, in other instances, the monomeric and/or oligomeric curable material is photo-polymerizable at visible wavelengths of the elec- tromagnetic spectrum. In some embodiments, a photoinitiator is employed to begin the photocuring.

Accordingly, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a photocurable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

Additionally, a monomeric photocurable material and/or an oligomeric photocurable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material comprises a mono(meth)acrylate, a difunctional curable material comprises a di(meth)acrylate, a trifunctional curable material comprises a tri(meth)acrylate, a tetrafunctional curable material comprises a tetra(meth)acrylate, and a pentafunctional curable comprises a penta(meth)acrylate. Other monofunctional, difunctional, trifunctional, tetrafunctional, and pentafunctional curable materials may also be used.

Any monomeric photocurable material or combination of monomeric photocurable materials not inconsistent with the objectives of the present disclosure may be used. In some embodiments, a monomeric photocurable material of a polymerizable liquid described herein comprises one or more species of acrylates and/or (meth)acrylates, such as one or more monofunctional, difunctional, trifunctional, tetrafunctional acrylates or (meth)acrylates, and/or pentafunctional (meth)acrylates. In some embodiments, for instance, a monomeric photocurable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl acrylate, isobornyl (meth)acrylate, acryloyl morpholine, isobornyl acrylate, isobornyl methacrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric photocurable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric photocurable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis (4-hydroxycyclohexyl)methane, hydroquinone, 4,4'-dihydroxybiphenyl, bisphenol A, bisphenol F, or bisphenol S. A monomeric photocurable material described herein may also comprise 1,1-trimethylolpropane tri(meth)acrylate, pentaerythritol monohydroxy tri(meth)acrylate, dipentaerythritol monohydroxy penta(meth)acrylate, and/or bis (trimethylolpropane) tetra(meth)acrylate. Further, in some cases, a monomeric photocurable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate. In some cases, a monomeric photocurable material comprises a cycloaliphatic epoxy, N-vinylpyrrolidone, or isocyanurate polyacrylate. In some embodiments, the isocyanurate polyacrylate is of Formula I:

wherein $R^1$-$R^3$ are independently selected from the group consisting of hydrogen and alkyl and m, n, and p are integers independently ranging from 1 to 10.

In some embodiments, the isocyanurate polyacrylate is present in an amount of at least 20 weight percent or at least 30 weight percent, based on total weight of the polymerizable liquid. The isocyanurate polyacrylate can also be present in an amount of 30-60 weight percent, based on total weight percent of the polymerizable liquid.

Additional non-limiting examples of commercially available monomeric photocurable materials useful in some embodiments described herein include the following: isobornyl acrylate (IBOA), commercially available from SARTOMER under the trade name SR 506; isobornyl methacrylate, commercially available from SARTOMER under the trade name SR 432A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; a cyclic monofunctional acrylate, commercially available by RAHN USA Corp. under the trade name GENOMER 1120; and dipentaerythritol pentaacrylate, commercially available from SARTOMER under the trade name SR 399 LV. Other commercially available monomeric photocurable materials may also be used.

In some embodiments, the monomeric photocurable material comprises a heterocycle comprising two or more unsaturated substituents. The substituted heterocycle, for example, can comprise three unsaturated substituents. The heterocycle can be polyallylated, in some embodiments. In being polyallylated, the heterocycle comprises two of more allyl substituents. For example, a polyallylated heterocycle can comprise a polyallyl isocyanurate. Alternatively, a heterocycle comprising two or more unsaturated substituents can be of Formula II:

wherein $R^4$-$R^6$ are independently selected from the group consisting of hydrogen and alkyl and m, n, and p are integers independently ranging from 1 to 10.

The heterocycle comprising two or more unsaturated substituents, including the heterocycle of Formula II, can be present in the polymerizable liquid in any amount not inconsistent with the objectives described herein. In some embodiments, the heterocycle is present in an amount of 5-30 weight percent, based on total weight of the polymerizable liquid.

In some embodiments, a ratio of the isocyanurate polyacrylate to the heterocycle comprising two or more unsaturated substituents is 1:4 to 4:1 or 1:3 to 3:1. The ratio of isocyanurate polyacrylate to the heterocycle comprising two or more unsaturated substituents, for example, can be about 1:1.

The monomeric photocurable material, in some embodiments, is selected from the group consisting of aliphatic diacrylates, aliphatic dimethacrylates, cycloalkyl diacrylates, isobornyl acrylate, isobornyl methacrylate, and mixtures thereof.

The monomeric photocurable material can be present in the polymerizable liquid in any amount not inconsistent with the objectives described herein. In some embodiments, the monomeric photocurable material is present in an amount of 10-90 weight percent, based on total weight of the polymerizable liquid. The monomeric photocurable material may also be present in an amount of 20-80 weight percent or 30-60 weight percent, based on total weight of the polymerizable liquid.

Polymerizable liquids described herein can comprise an oligomeric photocurable material. The oligomeric photocurable material can be present in a mixture with the monomeric photocurable material or can be present in the absence of monomeric photocurable material. In general, any oligomeric photocurable material not inconsistent with the objectives of the present disclosure may be used in a polymerizable liquid described herein. In some embodiments, the oligomeric photocurable material comprises a diacrylate and/or dimethacrylate of esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S, 1,1,1-trimethylolpropanetri(meth)acrylate, or ethoxylated or propoxylated glycerol tri(meth)acrylate. An oligomeric material may also comprise a cycloaliphatic epoxy.

An oligomeric photocurable material can comprise urethane diacrylate, urethane dimethacrylate, aliphatic urethane diacrylate, aliphatic urethane dimethacrylate, polyester diacrylate, polyester dimethacrylate, or mixtures thereof. Some non-limiting commercially available oligomeric materials include alkoxylated tetrahydrofurfuryl acrylate, commercially available from SARTOMER under the trade name SR 611; a multifunctional acrylate oligomer, commercially available under the trade name BOMAR BR-952 from DYMAX; aliphatic polyether urethane acrylate, commercially available from DYMAX Corporation under the trade name BR-371 S; CN1964 from SARTOMER; Genomer 4247 or 1122 from RAHN USA, and/or oligomeric materials under the EBECRYL® trade designation from ALLNEX, such as EBECRYL® 5781, 5850, 7320, 8402 and/or 4859.

Oligomeric photocurable material can be present in the polymerizable liquid in any amount not inconsistent with the objectives described herein. In some embodiments, for example, oligomeric photocurable material is present in an amount of 10-70 weight percent or 20-60 weight percent, based on total weight of the polymerizable liquid. In some embodiments, oligomeric curable material is present in an amount of 0-70 weight percent, based on tot weight of the polymerizable liquid.

Polymerizable liquids described herein also comprise a photoinitiator component for initiating polymerization or curing of the liquid. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 420 nm or between about 300 nm and about 385 nm, to yield free radical(s).

Examples of alpha cleavage photoinitiators are Irgacure 184 (CAS 947-19-3), Irgacure 369 (CAS 119313-12-1), and Omnirad (Irgacure) 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, polymerizable liquids containing ionic dye-counter ion compounds can be polymerized upon exposure to visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a polymerizable liquid described herein in any amount not inconsistent with the objectives of the present disclosure. In some embodiments, a photoinitiator is present in an amount of up to about 5 wt. %, based on the total weight of the polymerizable liquid. In some cases, a photoinitiator is present in an amount ranging from about 0.1 wt. % to about 5 wt. %.

Moreover, in some embodiments, a polymerizable liquid described herein can further comprise one or more sensitizers. A sensitizer can be added to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in the polymerizable liquid in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the polymerizable liquid.

As described herein, the polymerizable liquid comprises a dye component. In some embodiments, the dye component fades during photocuring of the polymerizable liquid to provide an article satisfying the relation $$\frac{T_a}{T_c} \geq 0.75$$

where $T_a$ and $T_c$ are maximum transmittance values from 400-500 nm for the article and a dyeless control article, respectively. In some embodiments, $$\frac{T_a}{T_c} \geq 0.8 \text{ or } \frac{T_a}{T_c} \geq 0.9.$$

In some embodiments, the dye component provides desirable control of light penetration depth during printing of articles described herein. Such control can enable the ability to resolve fine holes, slots, and fine features while greatly improving the printed surface quality and accuracy for surfaces perpendicular to the direction of light.

Notably, in some embodiments, the dye component fades significantly when the printed green cured part is placed in an additional light curing chamber to complete the polymerization process. Fading of the dye component can ensure polymerization is complete over the entire cross-sectional thickness of the printed article. In this way, desired mechanical and/or chemical properties of the article are achieved. Moreover, the post-light cured article can be free or substantially free of the dye color as characterized by the $$\frac{T_a}{T_c}$$

values disclosed herein.

In some embodiments the dye component comprises a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

In some embodiments, for example, the dye component comprises one or more of the following species:

It is contemplated herein that the di-keto dye structures described herein can adopt and enol/keto form:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

In some embodiments, the dye component comprises one or more of the following species of formula II:

wherein $R^{10}$-$R^{19}$ are independently selected from the group consisting of hydrogen, alkyl, and —$OR^{20}$ wherein $R^{20}$ is selected from the group consisting of hydrogen, alkyl, aryl, alkyl-aryl and aryl-alkyl; and/or formula III:

wherein $R^{21}$-$R^{25}$ are independently selected from the group consisting of hydrogen, alkyl, and —$OR^{27}$ wherein $R^{27}$ is selected from the group consisting of hydrogen, alkyl, aryl, alkyl-aryl, and aryl-alkyl, and wherein $R^{26}$ is selected from the group consisting of alkyl and —$OR^{28}$ wherein $R^{28}$ is selected from the group consisting of hydrogen, alkyl, aryl, alkyl-aryl, and aryl-alkyl; and/or formula IV:

wherein $R^{29}$-$R^{38}$ are independently selected from the group consisting of hydrogen, alkyl, and —$OR^{39}$ wherein $R^{39}$ is selected from the group consisting of hydrogen, alkyl, aryl, alkyl-aryl, and aryl-alkyl.

Additionally, in some embodiments, the dye component can comprise one or more azo dyes. For example, a dye component can comprise one or more Solvent Yellow dyes, such as Solvent Yellow 56.

Figure 1:
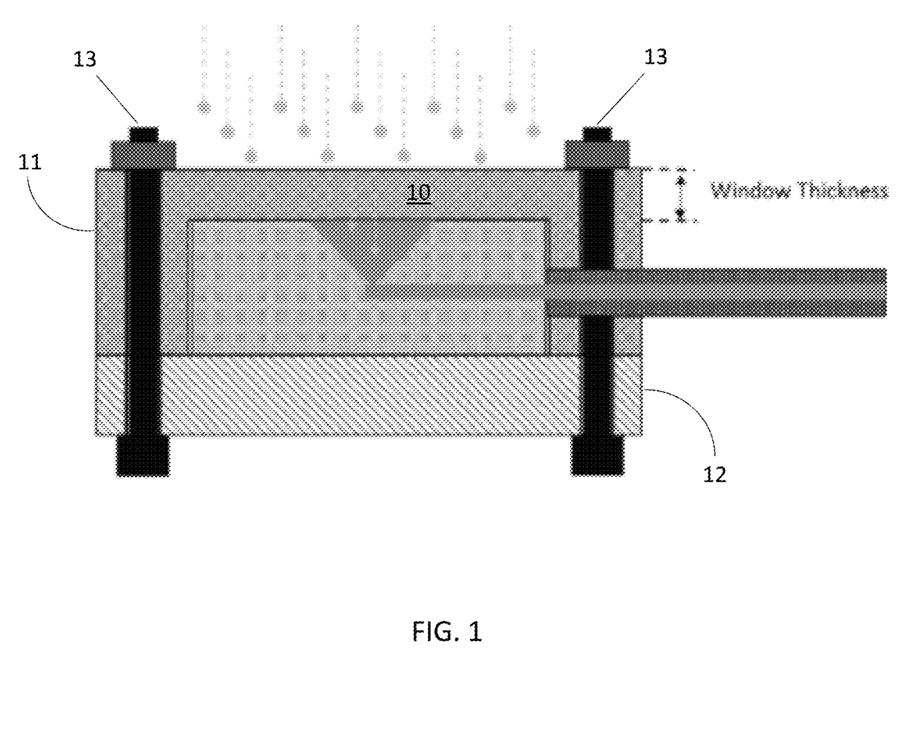

As described herein, the dye component can fade during photocuring of the polymerizable liquid to provide an article satisfying the relation $$\frac{T_a}{T_c} \geq 0.75$$

where $T_a$ and $T_c$ are maximum transmittance values from 400-500 nm for the article and a dyeless control article, respectively. Fading of the dye component to meet the $$\frac{T_a}{T_c}$$

values described herein is determined according to the following protocol. An International Light Technologies ILT spectroradiometer with a RAA4 Right-Angle Cosine Adaptor light collecting head and fiber optic cable. The light collecting head is placed within two three-dimensional printed parts as illustrated in FIG. 1. The light collecting heat is flush with a flat window (10) of specified thickness made of the photocured polymerizable liquid of interest. The two parts (11, 12) are held together by four machine screws (13). The light collecting head and test sample assembly are attached to a fixture to control position and orientation.

Figure 2:
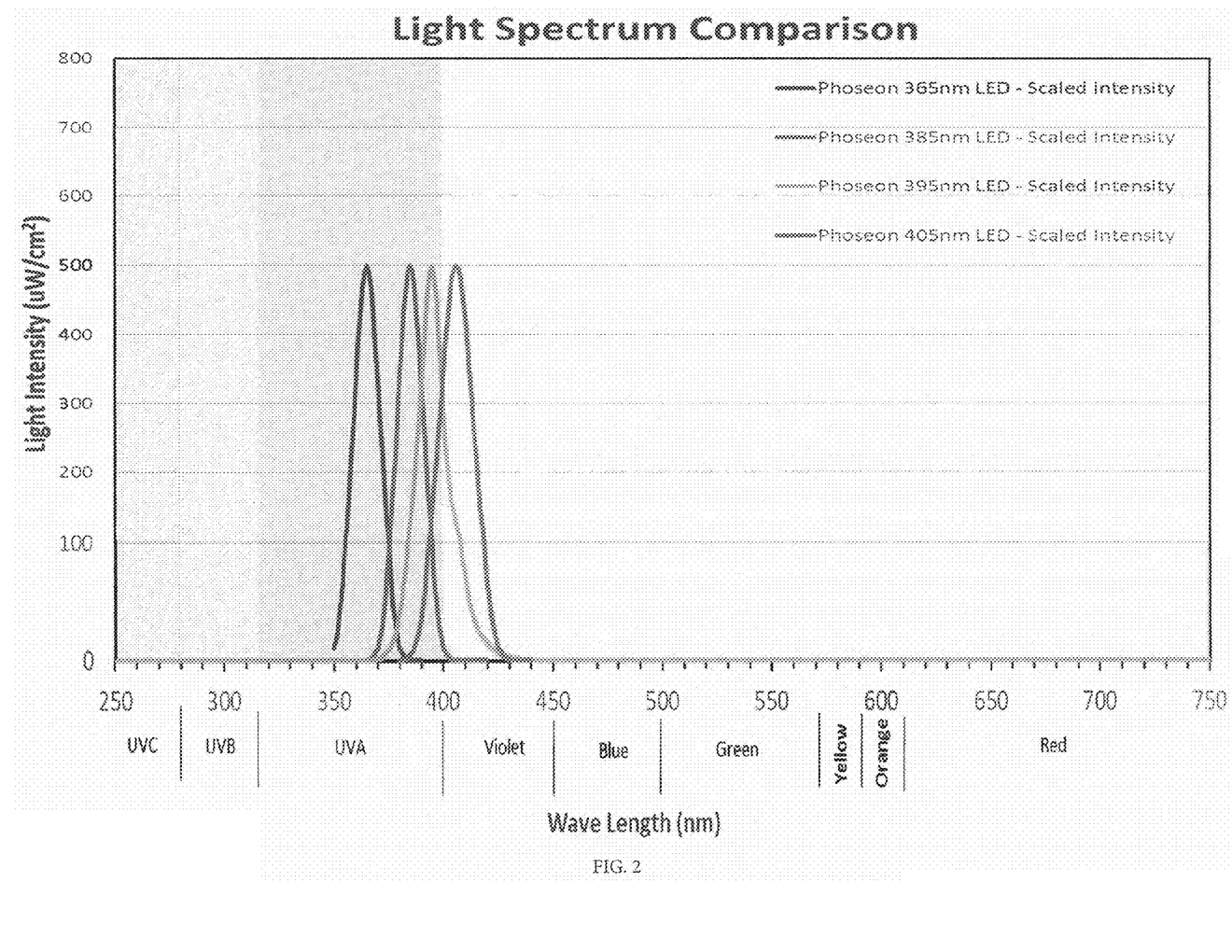
FIG. 2 illustrates various spectra for Phoseon LED light heads that can be used.

The assembly is placed into a light chamber or beneath a light source with a spectrum of interest. For measuring the light transmissivity of samples, an LED light source is employed with a peak wavelength corresponding to the absorption maximum of the dye component from 400-500 nm. As described herein, $T_a$ value is designated for the sample containing the dye component, and the $T_c$ value is designated for the same material formulation without the dye component. The maximum transmittance values for the samples are the maximum irradiance of light at the peak wavelength of the LED light source passing through the samples. The samples are of the same defined thickness. FIG. 2 illustrates various spectra for Phoseon LED light heads that can be used.

Alternatively, for measuring the light transmissivity of samples for post cure depth control inside a UV post curing chamber, the light spectrum of interest is the spectrum of the light source used in the UV post cure chamber. In this technique employing the broad spectrum light source of the UV post cure chamber, the maximum transmittance values are the maximum irradiance of light between 400-500 nm passing through a sample of defined thickness. As described herein, $T_a$ value is designated for the sample containing the dye component, and the $T_c$ value is designated for the same material formulation without the dye component. The ratio $$\frac{T_a}{T_c}$$

can then be measured to determine the transmissivity of a sample containing a UV absorbing dye designed to survive and help control cure depth during printing, but designed to fade during post curing to allow for maximum light penetration depth during post curing.

In some embodiments, one or more dyes falling under formulas I-IV satisfy the $$\frac{T_a}{T_c}$$

limitations of the finished light-cured article. Additionally, polymerizable liquids described herein can comprise a dye component including one or more dyes irrespective of the $$\frac{T_a}{T_c}$$

limitations of the finished light-cured article. In some embodiments, the dye component can comprise any dye falling under formulas I-IV irrespective of the $$\frac{T_a}{T_c}$$

limitations of the finished light-cured article.

The dye component can be present in the polymerizable liquid in any amount consistent with the objectives described herein. Amount of dye component can be selected according to several considerations including, but not limited to, design parameters of the article and/or compositional identity of the monomeric and/or oligomeric photocurable materials. Generally, the dye component is present in an amount less than 0.5 weight percent, based on total weight of the polymerizable liquid. In some embodiments, for example, the dye component is present in an amount of 0.005-0.02 weight percent, based on total weight of the polymerizable liquid.

In another aspect, methods of printing three-dimensional articles are described herein. A method comprises providing a polymerizable liquid comprising a monomeric photocurable material, an oligomeric photocurable material, or mixtures thereof; a photoinitiator component; and a dye component. The polymerizable liquid is photocured to form the article, the article satisfying the relation $$\frac{T_a}{T_c} \geq 0.75$$

where $T_a$ and $T_c$ are maximum transmittance values under 400-500 nm for the article and a dyeless control article, respectively.

In another aspect, a method of printing a three-dimensional article comprises providing a polymerizable liquid comprising a monomeric photocurable material, an oligomeric photocurable material, or mixtures thereof; a photoinitiator component; and a dye component. The polymerizable liquid is photocured to form the article, wherein the dye component comprises a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl. In some embodiments, the dye component comprises a dye falling under one formulas II-IV.

Components of the polymerizable liquid employed in methods described herein can comprise any composition and/or properties described hereinabove. Additionally, the components can be present in the polymerizable liquid in any amount described hereinabove.

The polymerizable liquid is cured with light to form the article. The light curing process can comprise one or multiple steps. In some embodiments, the polymerizable liquid is initially exposed to a sufficient amount of light required to convert the liquid into a soft solid. The soft solid is a green cured state of the article. Additional photoreaction is required to complete the polymerization process and obtain the full mechanical strength of the article and achieve other material properties. This additional photoreaction can be completed by placing the green cured article in a light chamber and providing sufficient time, temperature, and light intensity at the correct wavelengths to complete the polymerization process. As used herein, the term "post-light curing" refers to the state of the article after completion of the full light initiated polymerization process. Therefore, a post-light cured article has not been subjected to further non-light induced polymerization processes, such as thermal curing.

In some embodiments, Articles formed according to methods described herein can have a post-light curing heat deflection temperature of at least 100° C. In some embodiments, the article has a post-light curing heat deflection temperature of at least 200° C. or at least 250° C. The article, in some embodiments, can have a post-light curing heat deflection temperature selected from Table I.

TABLE 1

| Printed Article Heat Deflection Temp. (° C.) |
| --- |
| 140-250 |
| 190-250 |
| 215-250 |
| >250 |
| ≥300 |

In corresponding to post-light cured articles, the heat deflection values recited herein are achieved without one or more additional steps, such as thermal curing. Accordingly, articles having heat deflection values described herein can be produced via light curing alone, thereby saving cost and time of additional processing steps, including heat curing. Heat deflection temperatures of printed articles described herein are determined according to ASTM D648 at a stress of 1.82 MPa. In some embodiments, the heat deflection values are in addition to the $$\frac{T_a}{T_c}$$

values of the post-light curing articles described herein.

In addition to high heat deflection temperatures, the article printed according to methods described herein can have desirable storage modulus at high temperatures. In some embodiments, the article has a storage modulus of at least 1500 MPa at 200° C. Moreover, the article can have a storage modulus greater than 1000 MPa at 250° C.

In some embodiments, the article is formed via a layer-by-layer process, wherein layer formation is administered via deposition and irradiation of a layer of the polymerizable liquid.

Layers of polymerizable liquids can be deposited according to an image of the 3D article in a computer readable format during formation of the three-dimensional article. The polymerizable liquid can be deposited according to preselected computer aided design (CAD) parameters. Moreover, in some cases, one or more layers of the polymerizable liquid described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a polymerizable liquid described herein onto a substrate, such as a build pad of a 3D printing system. In addition, in some embodiments, a method described herein further comprises supporting at least one of the layers of the polymerizable liquid with a support material. Any support material not inconsistent with the objectives of the present disclosure may be used.

It is also possible to form a 3D article from a polymerizable liquid described herein using stereolithography. For example, in some cases, a method of printing a 3D article comprises retaining the polymerizable liquid in a container and selectively applying energy to the polymerizable liquid in the container to solidify at least a portion of a polymerizable liquid, thereby forming a solidified layer that defines a cross-section of the 3D article. Additionally, a method described herein can further comprise raising or lowering the solidified layer to provide a new or second layer of polymerizable liquid, followed by again selectively applying energy to the polymerizable liquid in the container to solidify at least a portion of the new or second polymerizable liquid that defines a second cross-section of the 3D article. Further, the first and second cross-sections of the 3D article can be bonded or adhered to one another in the z-direction (or build direction corresponding to the direction of raising or lowering recited above) by the application of the energy for solidifying the polymerizable liquid. Moreover, selectively applying energy to the polymerizable liquid in the container can comprise applying electromagnetic radiation, such as UV and/or visible radiation, having a sufficient energy to initiate polymerization of the polymerizable material as described herein. In addition, in some cases, raising or lowering a solidified layer of polymerizable liquid is carried out using an elevator platform disposed in the container of fluid build material. A method described herein can also comprise planarizing a new layer of polymerizable liquid provided by raising or lowering an elevator platform. Such planarization can be carried out, in some cases, by a wiper or roller.

In another aspect, printed 3D articles are described herein. In some embodiments, a printed 3D article is formed from any of the polymerizable liquids described herein. 3D articles formed from polymerizable liquids described herein can satisfy the $$\frac{T_a}{T_c}$$

limitations described herein.

These foregoing embodiments are further illustrated in the following non-limiting examples.

EXAMPLES

Table 2 provides a formulation of a polymerizable liquid according to one embodiments described herein.

TABLE 2

| Chemical | Formula 10 |
|---|---|
| Urethane dimethacrylate | 19-21 |
| Isocyanurate polyacrylate | 33-35 |
| Cycloalkane diacrylate | 8-10 |
| Polyallyl isocyanurate | 32-34 |
| Curcumin | 0.005-0.01 |
| Photoinitiator | 3 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of printing a three-dimensional article comprising:
   providing a polymerizable liquid comprising:
      a monomeric photocurable material, an oligomeric photocurable material, or mixtures thereof;
      a photoinitiator component; and
      a dye component; and
   photocuring the polymerizable liquid to form the article, the article satisfying the relation $$\frac{T_a}{T_c} \geq 0.75$$

where $T_a$ and $T_c$ are maximum transmittance values from 400-500 nm for the article and a dyeless control article, respectively.

2. The method of claim 1, wherein

$$\frac{T_a}{T_c} \geq 0.8.$$

3. The method of claim 1, wherein $$\frac{T_a}{T_c} \geq 0.9.$$

4. The method of claim 1, wherein peak absorption of the dye component is less than 450 nm.

5. The method of claim 1, wherein the dye component comprises a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

6. The method of claim 1, wherein the monomeric photocurable material is present in an amount of 10-90 weight percent, based on total weight of the polymerizable liquid.

7. The method of claim 1, wherein the oligomeric photocurable material is present in an amount of 0-70 weight percent, based on total weight of the polymerizable liquid.

8. The method of claim 1, wherein the article has a post-light curing heat deflection temperature of at least 100° C. according to ASTM D648 at a stress of 1.82 MPa.

9. The method of claim 1, wherein the article has a post-light curing heat deflection temperature of at least 200° C. according to ASTM D648 at a stress of 1.82 MPa.

10. The method of claim 1, wherein the monomeric photocurable material is selected from the groups consisting of aliphatic diacrylates, aliphatic dimethacrylates, cycloalkyl diacrylates, isobornyl acrylate, isobornyl methacrylate, and mixtures thereof.

11. The method of claim 1, wherein the dye component is present in an amount of up to 5 weight percent, based on the total weight of the polymerizable liquid.

12. The method of claim 1, wherein the monomeric photocurable material comprises isocyanurate polyarcylate.

13. The method of claim 12, wherein the isocyanurate polyacrylate is present in an amount of at least 20 weight percent, based on total weight of the polymerizable liquid.

14. The method of claim 12, wherein the monomeric photocurable component further comprises a polyallylated heterocycle.

15. The method of claim 12, wherein the polyallylated heterocycle is a polyallyl isocyanurate.

16. The method of claim 15, wherein a ratio of the isocyanurate polyacrylate to the polyallyl isocyanurate is 1:4 to 4:1.

17. The method of claim 1, wherein the article has a storage modulus of at least 1500 MPa at 200° C.

18. The method of claim 1, wherein the article has a storage modulus of at least 1000 MPa at 250° C.

19. The method of claim 1, wherein the monomeric photocurable material comprises a heterocycle comprising two or more unsaturated substituents.

20. A method of printing a three-dimensional article comprising:
    providing a polymerizable liquid comprising:
        a monomeric photocurable material, an oligomeric photocurable material, or mixtures thereof;
        a photoinitiator component; and
        a dye component; and
    photocuring the polymerizable liquid to form the article, wherein the dye component comprises a dye of formula I:

wherein $R^1$-$R^8$ are independently selected from the group consisting or hydrogen, alkyl, and —$OR^9$ wherein $R^9$ is selected from the group consisting of hydrogen, alkyl, aryl, alkyl-aryl and aryl-alkyl.

21. The method of claim 1, wherein the printing method is a layer-by-layer 3D printing method.

22. The method of claim 21, wherein layer formation is administered via deposition and irradiation of a layer of the polymerizable liquid.

23. The method of claim 20, wherein the printing method is a layer-by-layer 3D printing method.

24. The method of claim 23, wherein layer formation is administered via deposition and irradiation of a layer of the polymerizable liquid.

* * * * *